Oct. 27, 1953      F. A. KROHM      2,657,083

COUPLING MEANS

Filed Dec. 13, 1945

INVENTOR.
FRED A KROHM
BY
Charles S. Perfell
ATTORNEY

Patented Oct. 27, 1953

2,657,083

UNITED STATES PATENT OFFICE 2,657,083

COUPLING MEANS

Fred A. Krohm, Gary, Ind., assignor to Productive Inventions, Inc., a corporation of Indiana Application December 13, 1945, Serial No. 634,805

6 Claims. (Cl. 287—53)

This invention relates generally to windshield cleaner means and more particularly is directed to improved means for effecting a connection between the arm supporting the cleaner means and the drive shaft of operating means.

In the windshield cleaner field various forms or kinds of means have been employed for coupling or connecting together the cleaner supporting arm and drive shaft of operating means.

When changes are made in the specifications with respect to that portion of the shaft to which the arm is adapted to be connected or a new shaft end construction is introduced to the automotive industry, it usually becomes necessary to design and construct a coupling or attaching means that will properly cooperate with the change made in the shaft. Under such circumstances, and to avoid unnecessary expense, it is desirable that one engaged in the manufacture of arm and wiper parts or assemblies provide, when possible, a coupling means whereby all arms being currently manufactured by it may be attached to the modified shaft.

The present invention is therefore directed to means whereby, for example, an arm corresponding or similar to the arm disclosed in the Theodore J. Smulski Patent Number 2,326,402 dated August 10, 1943, may be connected to a different form or modified shaft end construction.

Accordingly, a particular object of the invention is to provide improved coupling means or an adapter which may be easily and quickly assembled with respect to the shaft and arm.

More particularly, the invention is directed to a unique coupling unit preferably comprised of a plurality of complementary sections or parts which are preferably hingedly or pivotally connected together by resilient or flexible means whereby the unit may be snapped onto the shaft in at least one of a plurality of rotative positions.

One important object of the invention is to provide coupling means preferably comprised of a plurality of complementary sections or parts which may be economically manufactured and assembled on a production basis.

Other objects and advatages of the invention will become evident after considering the description hereinafter set forth in conjunction with the drawing annexed hereto.

Figure 1:
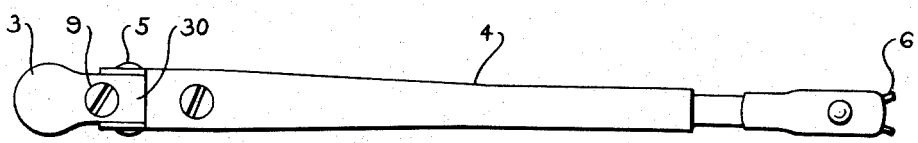
Figure 1 illustrates a top plan view of a windshield cleaner or wiper arm assembly.

The structure illustrated in Figures 1 through 4 of the drawing includes, among other things, coupling means generally designated 1 connected to a shaft 2, a housing part 3 attached to the coupling means, an arm 4 pivotally connected at one end to part 3 by a pivot 5, and means 6 adjacent the free end of the arm to which a wiper blade or cleaner may be secured.

The arm is adapted to be connected to the shaft by positioning the complementary generally semi-cylindrical sections 7 and 8 of the coupling on the shaft, fitting the part 3 over the coupling, and then operating the screw 9 to drive wedge means 10 to act upon or influence the sections to clamp or grip the shaft and simultaneously fasten the part 3 to the coupling. The sections are preferably constructed from some desirable die-cast material.

Any resilient means may be employed to urge the arm toward the windshield, but as herein illustrated, resilient means 11 carried by arm 4 engages roller abutment means 12 on the part 3 for this purpose.

The shaft 2 is cylindrical and its extremity is preferably provided with a pair of corresponding planar surfaces or flats 13 extending in planes substantially parallel to the longitudinal axis of the shaft. These flats are preferably interrupted, and these interruptions, together with the shoulders 14 on the shaft, form a pair of diametrically disposed corresponding notches 15, resulting in a restricted or neck portion 16. The notches 15 receive corresponding chordal-shaped projections 17 formed on sections 7 and 8 of the adapter.

Figure 2:
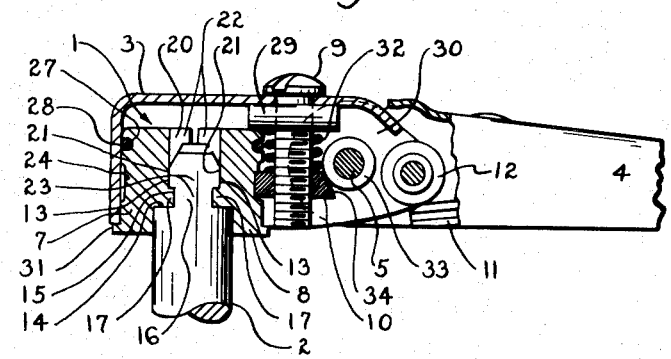
Figure 2 is a vertical section illustrating the application of the invention to the arm illustrated in Figure 1, and to an improved shaft end construction.
Figure 4:
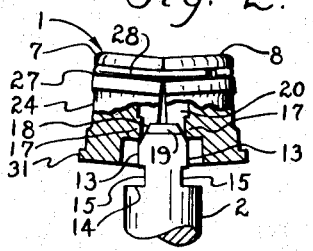
Figure 4 is a side view showing the preferred mode or manner in which the improved coupling means or adapter is assembled to the shaft.
Figure 3:
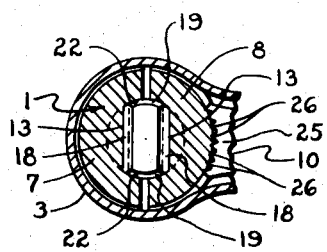
Figure 3 is a horizontal section taken through an appropriate part of the structure of Figure 2.

The shaft end is preferably provided with a pair of corresponding flat chamfers or facets 18 and a pair of corresponding curved chamfers or facets 19, opposite facets 18, whereby to assist in piloting the adapter onto the shaft as clearly illustrated in Figures 3 and 4. The sections of the adapter are provided with cavities which form an opening 20 generally rectangular in cross-section. The flat side walls 21 and the circular end walls 22 of the opening respectively engage the flats 13 and the circular surfaces 23 of the shaft, as clearly illustrated in Figures 2 and 3. Although not essential, the adapter is preferably provided with a circular recess which receives a circular portion of the shaft with the shoulders 14 of the latter bearing against the base of the recess and the under surfaces of projections 17. The adapter is also preferably provided with a relatively wide but shallow groove 24 within which the inner extremity 25 of the wedge means 10 operates. The extremity 25 is preferably provided with an arcuate row of teeth 26 which are adapted to bite into the base wall of the groove. This groove is preferably located intermediate the extremities of the adapter, particularly at a desirable location so that the wedge means will exert the necessary forces with respect to the sections 7 and 8 to hold the adapter to the shaft and the part 3 to the adapter. The arrangement is such that the extremity 25 is caught in the groove and this prevents the part 3 of the arm assembly from becoming detached from the shaft should the biting connection between the teeth and adapter accidentally loosen. One extremity of the adapter is preferably provided with an annular slot 27. A round spring ring 28 is received within the confines of the slot whereby to hingedly or pivotally connect together the sections 7 and 8.

In order to properly predetermine the axial position of the coupling means or adapter in the circular housing part 3 and the groove 24 substantially opposite the wedge 19, the screw 9 is preferably provided with a spacer or stop 29 which is engaged by the outer end of the adapter. This spacer also serves to provide a well-stabilized assembly since one side of the part 3 is open due to the radial channel extension 30. It will be noted that this radial channel, among other things, assists in guiding the movement of wedge means 10. Obviously, other means may be used to obtain such positioning. For example, the outer end wall of the part 3 may be indented or the adapter may be provided with abutment means preferably in the form of a radial annular flange such as 31. When reference is made to the fact that the adapter is provided with certain characteristics, for example, the flange 31, it is to be understood that a part of the flange is preferably disposed on each of the sections. The screw 9 preferably carries a helical spring 32 for normally maintaining the spacer 29 against the outer wall of part 3 and the wedge means in a predetermined axial position on the screw opposite the groove 24. The pivot pin 5 preferably carries a roller 33 which is of a size whereby the beveled cam surface 34 adjacent the outer extremity of the wedge means will engage the same to cause the arcuate row of teeth 26 provided adjacent the inner extremity 25 to engage and bite into the section 8 of the adapter when the screw is rotated in the proper direction.

To assemble the coupling means 3 to the shaft, it is merely necessary to direct the means in an axial direction toward the shaft so that the bevels or guiding facets 18 engage the projections 17 and then apply additional axial pressure to cause the sections 7 and 8 to spread apart and assume a diverging relation as illustrated in Figure 4, and when the section 8 engages the stop or spacer 29, or the projections 17 engage the shoulders 14, the projections 17 will snap into the notches 15 with the other portions of the sections engaging the proper portions of the shaft as above described, and as clearly illustrated in Figure 2 of the drawing. The annular spring ring 28, above referred to, in addition to providing a snap action, serves to at least temporarily hold the sections together while the coupling is being assembled to the shaft. Attention is directed to the fact that sufficient clearance is provided between the sections as evidenced in Figure 2 in order that all of the portions or surfaces of the sections which are to engage the intended portions of the shaft will engage such portions.

After the coupling means has been thus positioned on the shaft, the arm assembly illustrated in Figure 1 is then connected to the coupling means by fitting or telescoping the housing part 3 over the coupling means or adapter, after which the screw 9 is tightened to cause the wedge means 10 to operate and effectively direct the sections 7 and 8 to securely grip the shaft and at the same time secure the arm assembly to the coupling means. The arm assembly will, of course, be swung to the proper rotative radial position with respect to the coupling means and shaft prior to tightening the screw 9. The procedure to remove the arm from the coupling and the latter from the shaft is obvious.

Attention is directed to the fact that the shaft 2 is preferably installed in such a manner that the flats 13 of the shaft are arranged in a predetermined rotative position so that the wedge means will engage one or the other of the sections and not a portion of each section. In certain applications, however, it may be found desirable to provide auxiliary means for predetermining the rotative position of the arm means with respect to the coupling means; in such event, part 3 may be provided with a dimple or projection which may engage a slot provided in one of the sections or this relation might be reversed.

Figure 5:
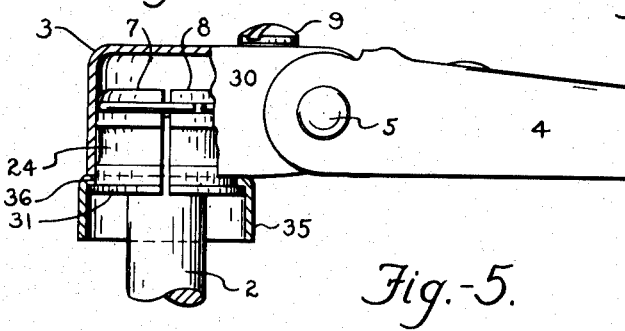
Figure 5 depicts another embodiment or modification to which the invention is susceptible.

As exemplified in Figure 5 of the drawing, the structure above described may be modified by providing a cylindrical shroudlike annulus or apron 35 having an inwardly extending radial flange 36 which sets upon the radial flange 31 of the coupling and bears against the lower circular marginal edge of the housing part 3 whereby to assist in protecting and concealing the connections established between the shaft, coupling, and arm assembly. This annulus may also serve to conceal a bearing within which the shaft is journaled or to conceal a transition piece disposed about the front end of the bearing. In the modified construction, the annulus 35 is placed about the sections after the latter have been applied to the shaft. This modified arrangement is preferably organized whereby the housing part 3 is drawn by the screw 9 to press against the annulus 35 to firmly secure the same in position. It is, of course, to be understood that the ring 28 may be omitted in the preferred or the modified construction.

In view of the foregoing description, it will be manifest that improved means have been provided whereby a coupling means may be easily and quickly attached to the shaft and the cleaner and supporting arm assembly will be easily and quickly connected to the coupling means.

Having thus described my invention, it is obvious that various modifications may be made in the same without departing from the spirit of the invention; and, therefore, I do not wish to be understood as limiting myself to the exact forms, constructions, arrangements, and combinations of parts herein shown and described.

I claim:

1. Driving means provided with a connecting portion, a pair of parts, said connecting portion being adapted for reception by said parts, resilient means for holding the parts connected during the operation of positioning the parts for such reception, and means for clamping the parts to said connecting portion.

2. A shaft provided with abutment means, a pair of substantially semi-cylindrical parts receiving and substantially surrounding said shaft, at least one of said parts having a portion adapted to engage the abutment means whereby to prevent rotation of the part with respect to the shaft, a single element carried by and holding the parts assembled and permitting the parts to spread apart when being connected to the shaft, and means substantially housing the parts for holding the portion and abutment means in interlocking relation.

3. A pair of parts adapted for connection to driving means, an arm assembly provided with means receiving said parts, and locking means carried by said receiving means operatively related to at least one of said parts whereby when said parts are secured to the driving means by the locking means, the receiving means will also be secured to said parts.

4. Coupling means comprising, a pair of complementary sections adapted for rotative connection with driving means, a shroudlike member carried by said sections, and means for locking the sections together and bearing against said shroudlike member.

5. A shaft provided with a pair of abutment means, a pair of substantially semi-cylindrical corresponding parts receiving and substantially surrounding said shaft, each of said parts having a portion adapted to engage one of said abutment means whereby to prevent rotation of the parts with respect to the shaft, a single element carried by and holding the parts assembled and permitting the parts to spread apart when being connected to the shaft, and means substantially housing the parts for respectively holding the portions and abutment means in interlocking relation.

6. Coupling means comprising, a pair of complementary sections adapted for rotative connection with driving means, abutment means provided on the sections, a shroudlike member carried by said sections and surrounding the abutment means, means receiving the section, and means on the receiving means for locking the sections together and so that the receiving means will bear against said shroudlike member.

FRED A. KROHM.

References Cited in the file of this patent

UNITED STATES PATENTS

| Number | Name | Date |
| --- | --- | --- |
| 1,991 | Withers | Aug. 24, 1813 |
| 323,078 | Robinson | July 28, 1885 |
| 431,791 | Aldrich | July 8, 1890 |
| 687,864 | Smyth | Dec. 3, 1901 |
| 712,061 | Hanna | Oct. 28, 1902 |
| 1,024,344 | Langevin | Apr. 23, 1912 |
| 1,029,950 | Schulz | June 18, 1912 |
| 1,038,085 | Chubbuck | Sept. 10, 1912 |
| 1,218,505 | Anderson | Mar. 6, 1917 |
| 1,343,086 | Neil | June 8, 1920 |
| 1,388,911 | Allmand | Aug. 30, 1921 |
| 1,807,264 | Walker | May 26, 1931 |
| 2,040,678 | Van Buskirk | May 12, 1936 |
| 2,128,068 | Anderson | Aug. 23, 1938 |
| 2,295,621 | Zaiger | Sept. 15, 1942 |
| 2,312,279 | Zaiger | Feb. 23, 1943 |
| 2,326,402 | Smulski | Aug. 10, 1943 |

FOREIGN PATENTS

| Number | Country | Date |
| --- | --- | --- |
| 628,297 | France | June 27, 1927 |